United States Patent [19]

Höfer et al.

[11] 4,214,014
[45] Jul. 22, 1980

[54] METHOD FOR SURFACE TREATMENT OF CONTACT LENSES

[75] Inventors: Peter Höfer, Aschaffenburg; Wolfgang Kohl, Kleinwallstadt, both of Fed. Rep. of Germany

[73] Assignee: Titmus Eurocon Kontaklinsen GmbH & Co. KG, Aschaffenburg, Fed. Rep. of Germany

[21] Appl. No.: 950,894

[22] Filed: Oct. 12, 1978

[30] Foreign Application Priority Data

Dec. 16, 1977 [DE] Fed. Rep. of Germany ....... 2756114

[51] Int. Cl.² ............................ G02B 1/12; H01J 19/00
[52] U.S. Cl. ............................................ 427/40; 427/38
[58] Field of Search ..................................... 427/38, 40

Primary Examiner—James R. Hoffman

[57] ABSTRACT

Surface treatment for hard or dehydrated hydrophilic contact lenses, to reduce the deposit of impurities thereon, comprising subjecting the lens, after shaping and polishing, to a gas discharge, e.g., in an oxygen atmosphere.

9 Claims, 1 Drawing Figure

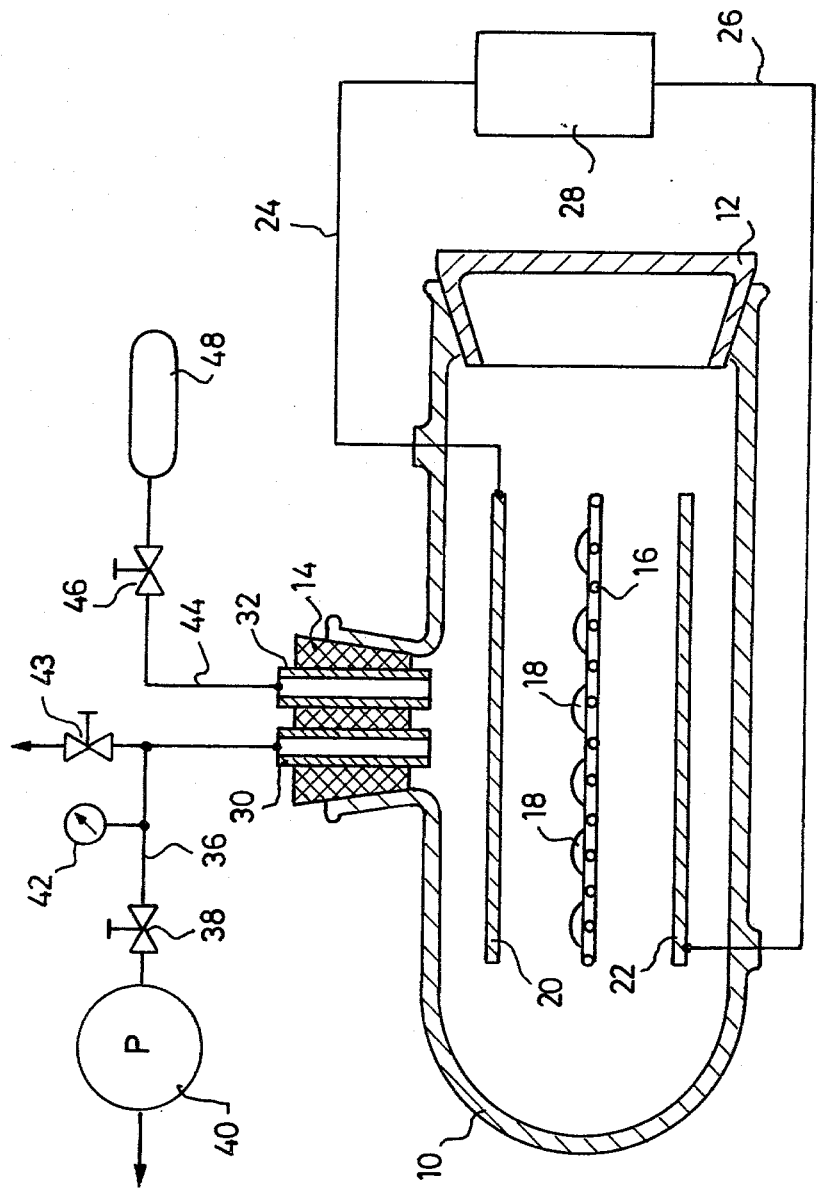

METHOD FOR SURFACE TREATMENT OF CONTACT LENSES

This invention relates to a method for treating the surface of contact lenses, particularly the dehydrated hydrophilic contact lenses.

In so-called hard contact lenses, e.g. contact lenses of PMMA (polymethyl methacrylate) or CAB (cellulose acetobutyrate), as well as in so-called soft contact lenses of hydrophilic material, e.g. poly-"Hema" (polyhydroxy ethyl methacrylate) which is hard in the dehydrated state, deposits of impurities gradually accumulate on the surfaces of the contact lens while it is being worn. These impurities, consisting of inorganic and organic substances, in particular proteins and lipids, impair vision and, in the case of soft contact lenses, reduce their gas permeability which in turn shortens the time interval during which the contact lens can be worn without complaints.

The thickness of these deposits depends substantially on the sebaceous production of the eye of the wearer. Since it has hitherto proven impossible to avoid the accumulation of impurities in the afore-mentioned contact lenses, the wearer had to remove the contact lenses on which impurities had accumulated and clean them with suitable lens cleaning agents, a procedure at best troublesome or bothersome for the wearer.

The present invention provides a method which substantially reduces the deposit of impurities, in particular of proteins and lipids, on contact lens surfaces, i.e., limiting the extent to which such deposits are formed.

Essentially, the method of the invention comprises subjecting the contact lens to a gas discharge after polishing.

It has been found that treating contact lenses in a gas plasma leads to a reduction in the deposition of impurities. This is all the more surprising, since it had to be assumed that plasma treatment of contact lens surfaces, which in itself is known in the case of contact lenses of hydrophobic silicone rubber to render them hydrophilic, would produce not only enhanced hydrophilic properties but also greater absorption of impurities. It has not yet been possible to provide a clear explanation for the surprising reduction in absorption by virtue of the plasma treatment of hard and hydrophilic soft contact lenses.

The surface treatment of the contact lens preferably occurs by a direct current discharge in an oxygen atmosphere. For this purpose, the contact lens is placed in a container which is then evacuated, flushed with oxygen and then adjusted to a pressure preferably equal to or less than 10 mm Hg before the gas discharge is initiated. A pressure amounting to 0.01 mm Hg is especially favorable. During the gas discharge, the current is preferably in the range of 10 to 100 mA and the voltage is preferably in the range of 200 to 1000 V.

An embodiment of the invention explained in detail below with reference to the drawing herein which illustrates in a schematic and partially sectional view an apparatus for executing the method.

With reference to the drawings, the illustrated apparatus includes a glass container 10 which can be closed by a cover 12 and a plug 14 to provide a gastight seal. A lens support 16, constructed as a glass grid onto which the contact lenses 18 to be treated are placed, is located within said container. Furthermore, two electrodes 20 and 22, which are preferably designed as plates, are disposed above and below the lens support and extend at least over the length thereof. (The mounts for the lens support and the electrodes are not shown).

Each electrode 20 or 22 is connected via a conductor 24 or 26 passing through the container wall to a voltage source 28, by means of which a controllable voltage can be applied to said electrodes.

A first connecting tube 30 and a second connecting tube 32 pass through the plug 14. The first connecting tube 30 is connected via a line 36 to a check valve 38 on a vacuum pump 40. The pressure in the interior of the container 10 can be measured by means of a vacuum gauge 42 connected to the line 36. A ventilation valve 43 is also connected to the line 36 as well. The second connecting tube 32 is connected via a line 44 to a check valve 46 on an oxygen source 48.

After the contact lenses 18 have been shaped and subsequently polished, they are placed on the lens support 16 and introduced into the container 10. After closing the container 10 by means of the cover 12, the check valve 38 is opened, the check valve 46 and ventilation valve 43 are closed and the container 10 is evacuated by means of the vacuum pump 40. Thereafter, the check valve 38 is closed and the check valve 46 opened so that from the oxygen source 48 flows into the container 10. After again reversing both check valves, the pressure of the oxygen atmosphere in the container 10 is lowered by the vacuum pump 40 to a suitable value equal to or less than 10 mm Hg. As soon as the desired vacuum has been attained, the check valve 38 is closed and the vacuum pump 40 is shut off. The voltage source 28 then applies to the electrodes 20 and 22 a voltage which is adequate for flow discharge so that the gas filling in the container is ionized and the surfaces of the contact lenses 18 are subject to the flow of ions and electrons between the electrodes. This plasma treatment causes not only the formation of polar OH groups in the surface area of the contact lenses which increases their hydrophilic properties but also the surprising reduction in the affinity for impurities, in particular lipids and proteins. After conclusion of the plasma treatment, the container 10 is vented via the ventilation valve 43 and the contact lenses are then removed from the container.

The desired effect is obtained even after brief plasma treatment of the contact lenses. Good results are achieved with a treatment time of 15 min. at a discharge current of 30 mA, a discharge voltage of 600 V and a vacuum of 0.5 mm Hg. The gas discharge can occur in an alternating electro-magnetic field and in an oxygen atmosphere.

It will be understood that the specification and examples are illustrative but not limitative of the present invention and that other embodiments within the spirit and scope of the invention will suggest themselves to those skilled in the art.

What is claimed is:

1. Method for treating the surface of a hard or dehydrated hydrophilic contact lens, which method comprises introducing a lens which has been shaped and polished into a container, evacuating the container, flushing same with an oxygen-containing atmosphere, re-evacuating to an absolute pressure of 10 mm Hg or less and then initiating a gas discharge and subjecting the lens to said gas discharge.

2. Method as claimed in claim 1, wherein the gas discharge is generated by glow discharge.

3. Method as claimed in claim 1, wherein the gas discharge occurs in an alternating electromagnetic field.

4. Method as claimed in claim 3, wherein the gas discharge occurs in an oxygen atmosphere.

5. Method as claimed in claim 1, wherein the gas discharge occurs in an oxygen atmosphere.

6. Method as claimed in claim 5, comprising introducing the contact lens into a container, evacuating the container, flushing with oxygen and then re-evacuating to an absolute pressure of 10 mm Hg or less, and then initiating the gas discharge.

7. Method as claimed in claim 6, wherein the oxygen atmosphere has a pressure of 0.01 mm Hg during the gas discharge.

8. Method as claimed in claim 7, wherein the gas discharge is effected with a current intensity in the range of 10 to 100 mA and a voltage in the range of 200 to 1000 V.

9. Method as claimed in claim 6, wherein the gas discharge is effected with a current intensity in the range of 10 to 100 mA and a voltage in the range of 200 to 1000 V.

* * * * *